Jan. 7, 1941. D. D. DEMAREST ET AL 2,228,075
SAUSAGE LINKING MACHINE
Filed March 22, 1939 7 Sheets-Sheet 2
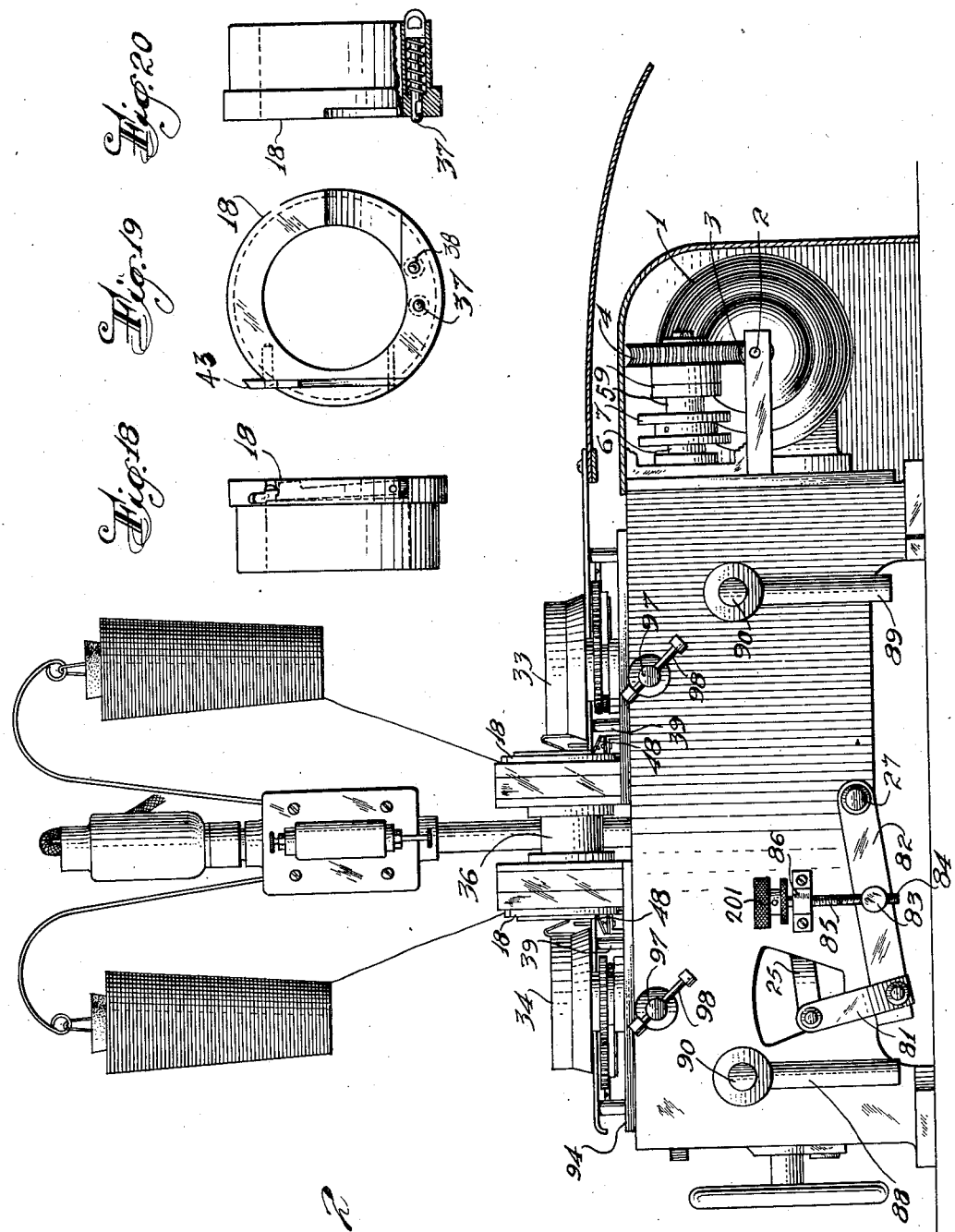
INVENTORS
DANIEL DOUGLAS DEMAREST
CARL BERENDT
BY WILLIAM KARIUS
Frank C. Fischer, Atty.

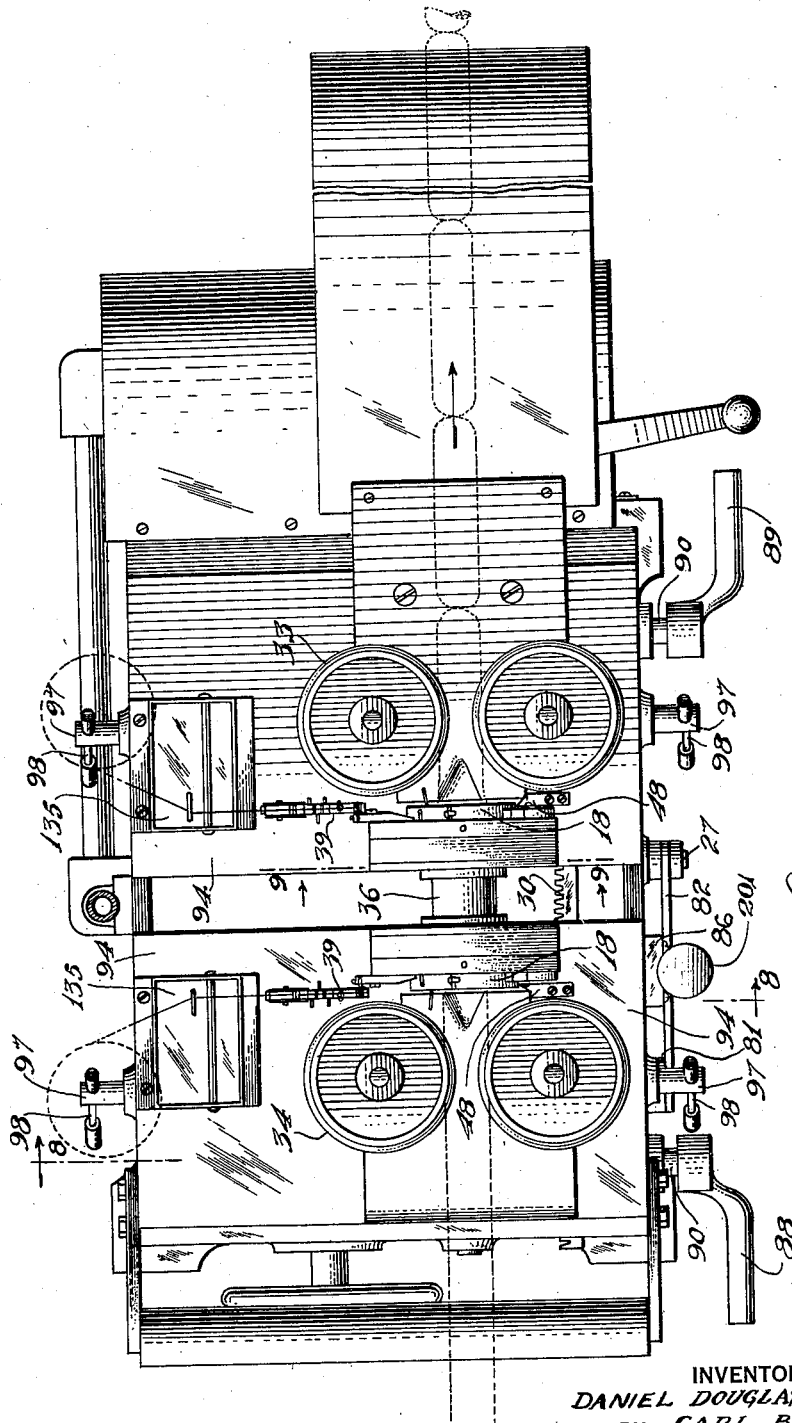

Jan. 7, 1941.　　D. D. DEMAREST ET AL　　2,228,075
SAUSAGE LINKING MACHINE
Filed March 22, 1939　　7 Sheets-Sheet 3
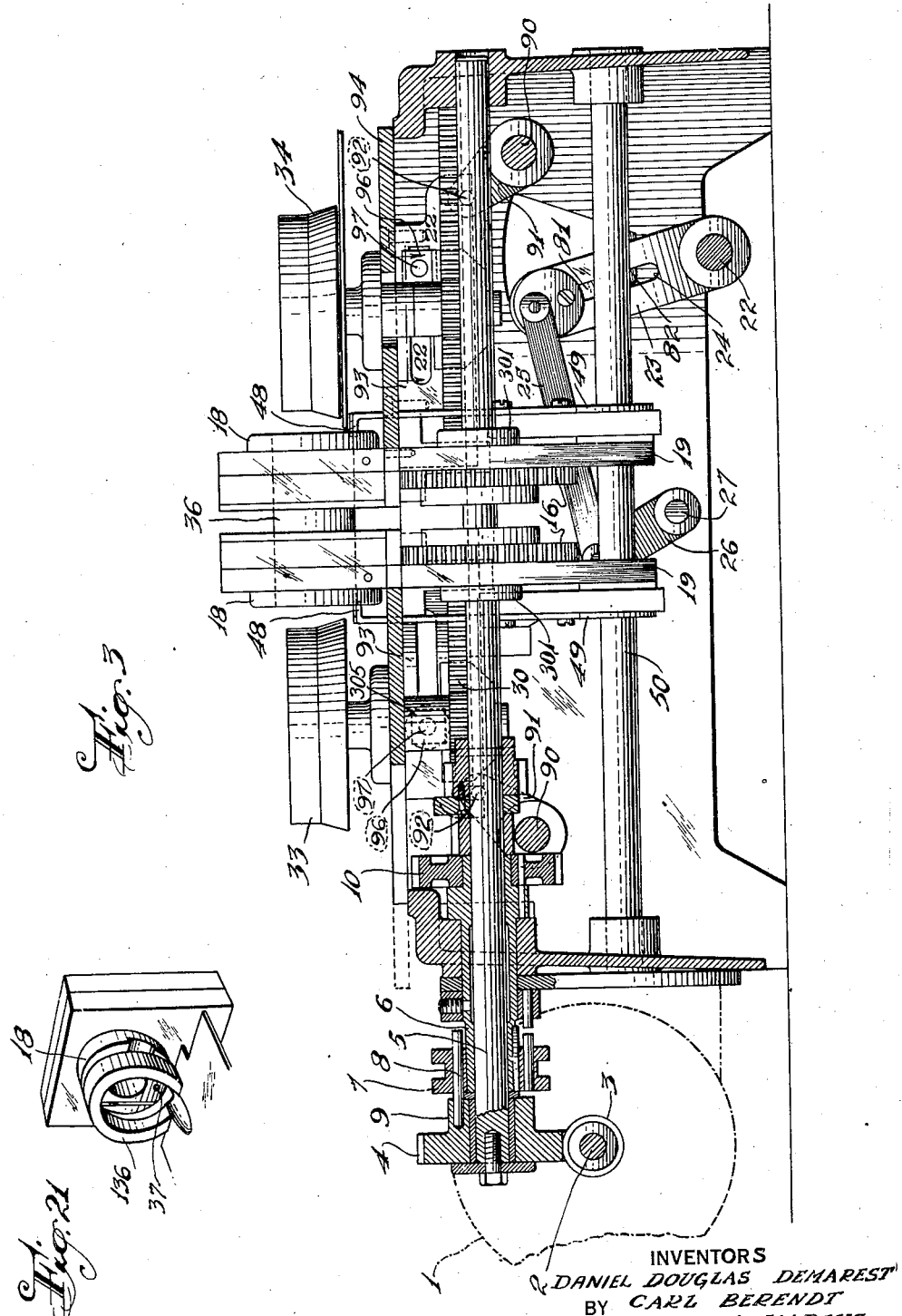
INVENTORS
DANIEL DOUGLAS DEMAREST
BY CARL BERENDT
WILLIAM KARIUS
Fredk C. Fischer, Atty.

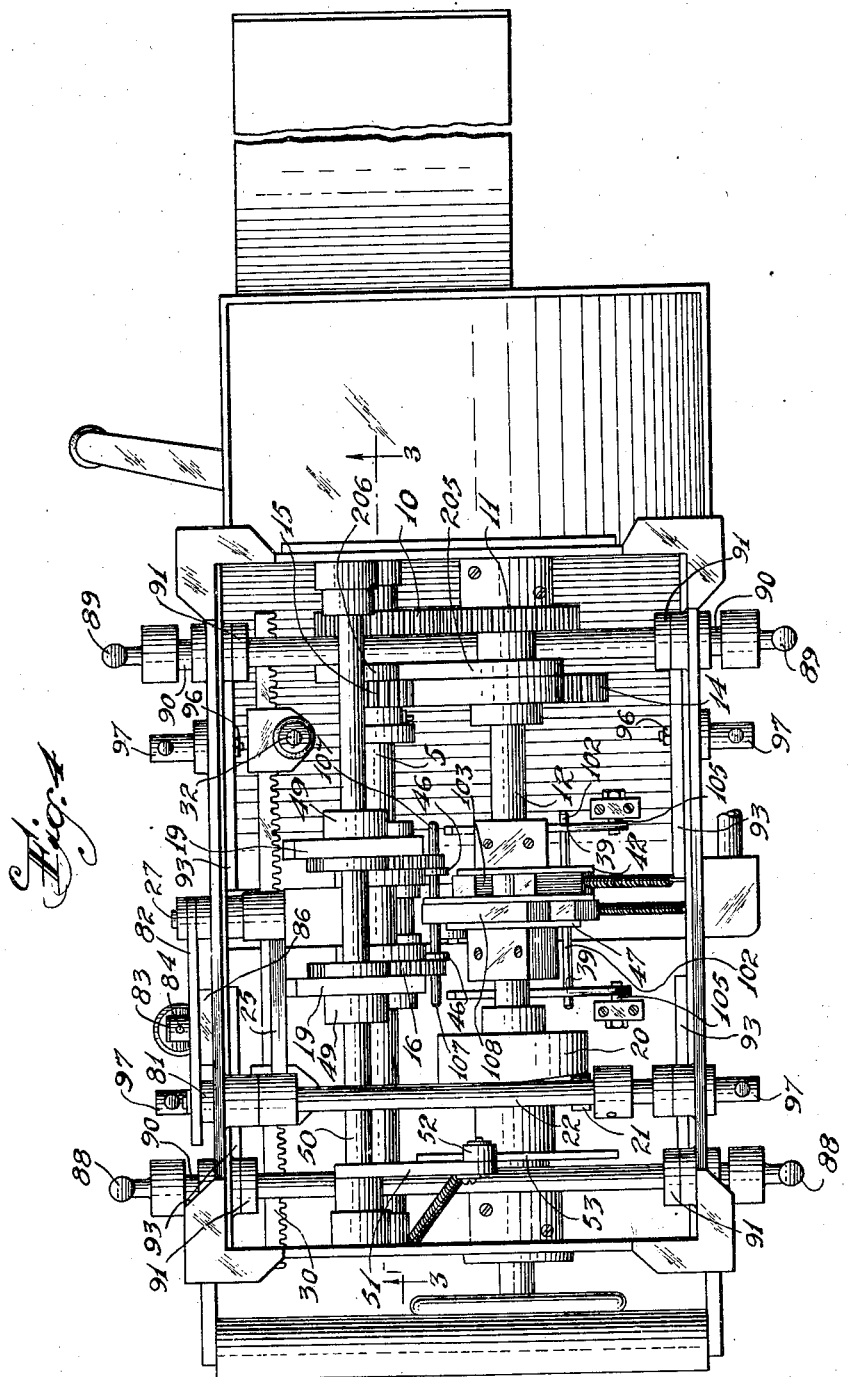

Jan. 7, 1941.    D. D. DEMAREST ET AL    2,228,075
SAUSAGE LINKING MACHINE
Filed March 22, 1939    7 Sheets-Sheet 5
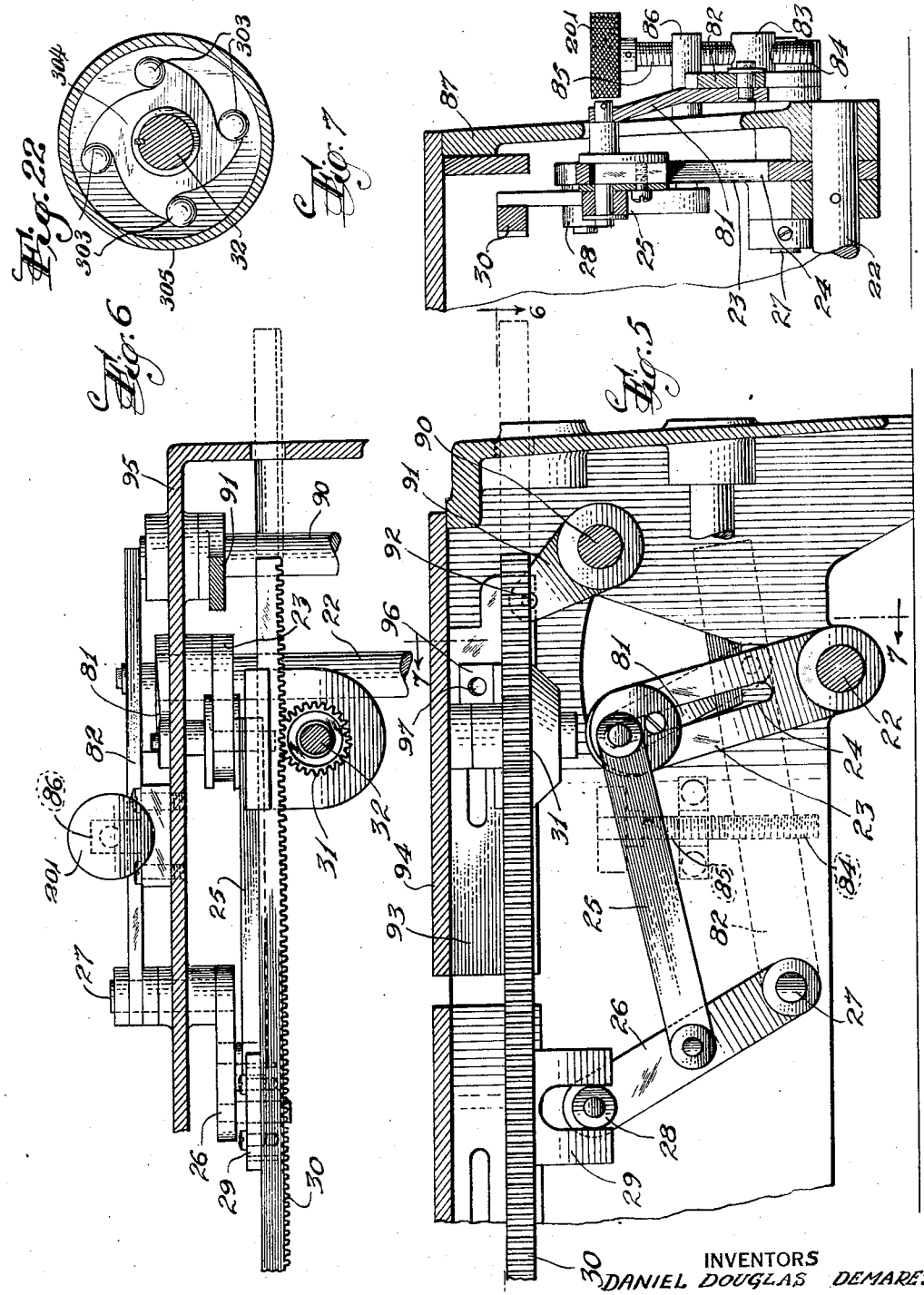
INVENTORS
DANIEL DOUGLAS DEMAREST
BY CARL BERENDT
WILLIAM KARIUS Jan. 7, 1941.                D. D. DEMAREST ET AL                2,228,075
                              SAUSAGE LINKING MACHINE
                              Filed March 22, 1939              7 Sheets-Sheet 6
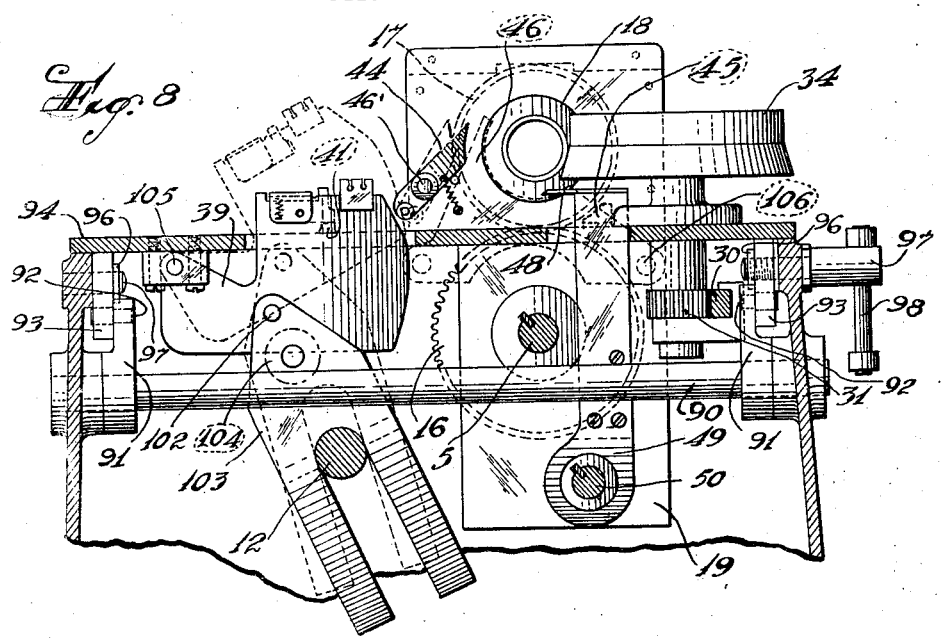
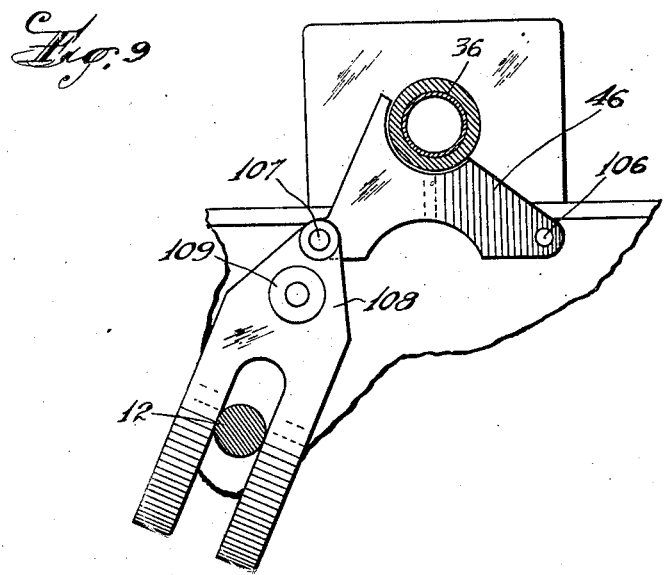
INVENTORS
DANIEL DOUGLAS DEMAREST
BY CARL BERENDT
WILLIAM KARIUS

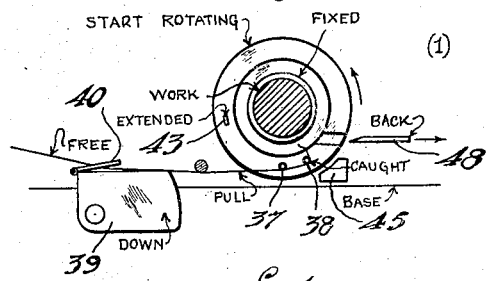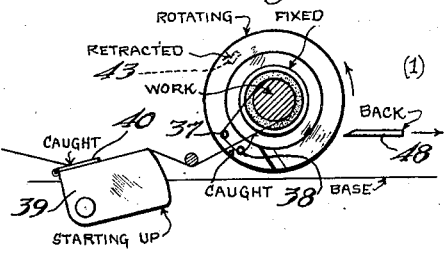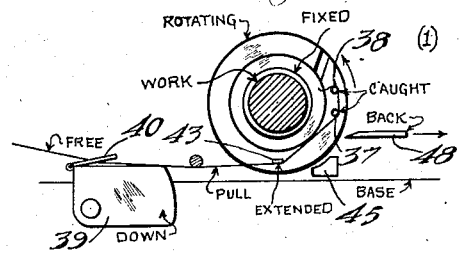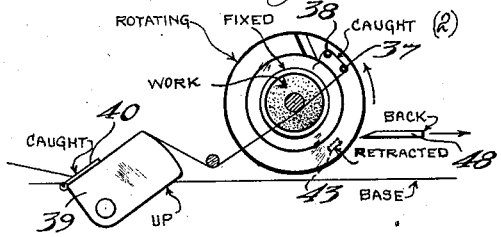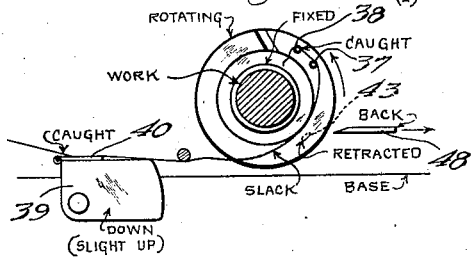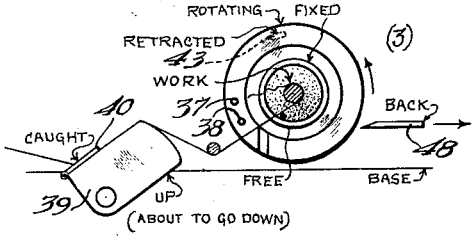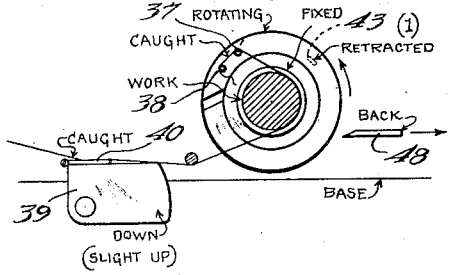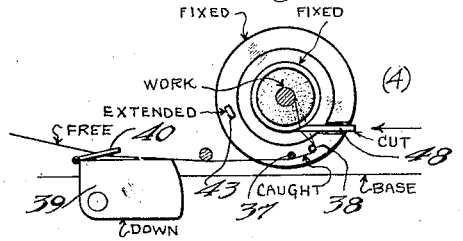
INVENTORS
DANIEL DOUGLAS DEMAREST
BY CARL BERENDT
WILLIAM KARIUS
Fred C. Fischer, Atty.

Patented Jan. 7, 1941

2,228,075

UNITED STATES PATENT OFFICE 2,228,075

SAUSAGE LINKING MACHINE

Daniel Douglas Demarest, Little Neck, N. Y., and Carl Berendt, East Orange, and William Karius, Irvington, N. J., assignors to Automatic Linker, Inc., Newark, N. J., a corporation of New York Application March 22, 1939, Serial No. 263,364

20 Claims. (Cl. 17—34)

This invention relates to improvements in machines for tying sausages into predetermined lengths, which enables the use of a casing formed from a material such as "Cellophane" of the like.

Heretofore, sausage meat has been encased in gut or other material which necessitated twisting in order to provide the sausage in links. However, the method of twisting the links has been found undesirable in that when the sausage is allowed to hang, the junctions of the various lengths have a tendency to untwist and the meat goes from one link to another. When a material such as "Cellophane" is used for a casing, twisting, in order to form links, is impractical as the "Cellophane" will not readily stay twisted. Also, heretofore, it has been the practice to squeeze the sausage in order to form the links and then to tie the junction between the links with a cord. Such an operation has been found to require a considerable amount of time and labor thus materially increasing the cost of the sausage.

It is, therefore, an object of this invention to provide a machine, by means of which both ends of a link of sausage can be simultaneously tied with a cord, the meat being squeezed from the joint during the tying operation.

A further object of the invention is to provide a machine for tying sausage into links, which requires no separate means for squeezing the meat from the junction of the links; and which can be adjusted to automatically tie the sausage into links of various lengths.

A further object of the invention is the provision in a machne for tying sausages into links, of means for automatically pulling a tying cord in a taut condition during the tying operation, so that the meat at the junction is positively squeezed into the adjacent link.

These and other advantageous objects, which will later appear, are accomplished by the simple and practical construction and arrangement of parts hereinafter described and exhibited in the accompanying drawings, forming part hereof, and in which:

Fig. 1 is a plan view of a sausage tying machine embodying the invention,

Fig. 2 is a side elevational view of the machine,

Fig. 3 is an inverted sectional view taken on line 3—3 of Fig. 4,

Fig. 4 is a bottom plan view of the machine,

Fig. 5 is an enlarged sectional view of a portion of the right-hand corner of Fig. 3, Fig. 6 is a view taken on line 6—6 of Fig. 5.

Fig. 7 is a view taken on line 7—7 of Fig. 5,

Fig. 8 is a view taken on line 8—8 of Fig. 1,

Fig. 9 is a view taken on line 9—9 of Fig. 1,

Figs. 10 to 17 are diagrammatic views showing the operations of the machine during the tying of a sausage, Fig. 18 is a side view of a collar used in the device, Fig. 19 is a front view of the collar, Fig. 20 is a sectional view of the collar, Fig. 21 is a perspective view of elements of the device, and Fig. 22 is an enlarged sectional view taken on line 22—22 of Fig. 3.

Referring to the drawings, in Fig. 3, the machine is shown to comprise an electric motor 1 having a shaft 2 provided with a worm 3 in mesh with a worm gear 4 rotatably mounted on a shaft 5 extending the length of the machine. Rotatably mounted on the shaft 5 is a sleeve 6 having splined thereto a collar 7 provided with a pin 8 adapted to enter a recess in the portion 9 integral with gear 4 to cause the sleeve and gear to rotate together. Affixed to the sleeve 6 is a gear 10, in mesh with a gear 11 (see Fig. 4) attached to shaft 12 to which is fixed an interrupted gear 14 in mesh with a gear 15 fixed to shaft 5. A pair of gears 16 are in mesh with gears 17 integral with collars 18 (see Figs. 1 and 8). The gears 16 are fixed to bushings 301 splined to shaft 5 and movable with brackets 19, which are supported by and movable with the upper platforms 94, the bushings passing through the brackets and having flanges engaging both sides of the brackets.

At the interrupted portion thereof, gear 14 is provided with a flange 205 frictionally engageable with smooth member 206 on shaft 5 to prevent slipping or other movement of gear 15 during the interruption of movement thereof. The flange 205 slides over the member 206, the force of contact between flange 205 and member 206 being insufficient to rotate shaft 5 and gear 15.

Attached to shaft 12 is a cam 20 having a slot in which is positioned the end of an arm 21 attached to a shaft 22 having fixed thereto an arm 23 having a slot 24 in which is slidably positioned one end of a link 25, the other end of the link being connected to a lever 26 pivoted at 27, the lever having a roller 28 at one end thereof engaging a support 29 depending from the underside of a rack 30 which engages a gear 31 (see Figs. 5, 6, 7) mounted on a vertical shaft 32 so that when the gear rotates in one direction the shaft will rotate therewith, and when the gear 31 rotates in the opposite direction the shaft 32 will remain stationary, this operation being accomplished by a one-way clutch of a common type which is shown in Fig. 22. This clutch is of a well known type having a plurality of spheres 303 which are adapted to engage a member 304 fixed to the shaft 32. Member 304 is so shaped that when it rotates in one direction the spheres will move freely therewith; but when member 304 rotates in an opposite direction, the spheres will be wedged between member 304 and the collar 305 to cause the collar 305 to move with the shaft 32. Attached to the collar 305 is a roller 33 which cooperates with a similar roller 34 for feeding sausage through the machine. Roller 34 is freely rotatable and moves only due to frictional contact with sausage passing between rollers 33 and 34.

In operation, the length of the links which are fed into the machine to be tied is determined by adjusting the position of the link 25 in the slot 24. This adjustment is accomplished by means of a link 81 attached at one end to the link 25 having the other end thereof attached to a lever 82 which is also pivotally connected to the lever 27, the lever 82 being upon the outside of the machine and having attached thereto a boss 83 which is threaded by a left-hand screw 84, having a head 201, the upper end of the screw having a portion 85 with right-handed threads which pass through a block 86 which is fixed to the outside of the casing 87. By rotating the screw 84, the lever 82 is caused to rise or fall as may be desired, carrying therewith the link 81 and also the end of the link 25, thus adjusting the operating length of the lever 23 and consequently the length of throw of the rack 30 which controls the length of sausage being fed to the machine. When the machine has been adjusted to accommodate a different length of sausage it is also necessary to adjust the distance between the collars 18 and this is accomplished by manipulating handles 88 and 89 (see Fig. 2) upon the outside of the machine; since the operation of handles 88 and 89 and the accompanying structure are the same, only one end of the machine will be described.

Each of the handles 88 and 89 is attached to shaft 90 which has fixed thereto an arm 91 having a pin 92 mounted in a short slot in a plate 93, the plate being integral with one of the upper platforms 94 of the machine, which is slidably mounted upon the side frame 95. By rotating the handle 88 the corresponding platform 94 can be adjusted to various positions to accommodate various lengths of sausage. After the platform 94 has been adjusted to the desired position it can be clamped in position by means of a nut and bolt 96 and 97 (see Fig. 5) which is controlled by a short handle 98 (see Fig. 1).

Inasmuch as brackets 19 are movable with the platforms 94, gears 16 will move with the brackets along shaft 5. Likewise, knife-supporting members 49, each of which supports a knife 48 and is mounted on a bushing splined to shaft 50, will be moved, as the bushing passes through the bracket 19 and has flanges or the like abutting sides of the bracket 19 and sides of the member 49.

The collars 18 are rotated by the gears 16 which are in mesh with the gears 17. The collars 18 surround a stationary tube 36 through which the sausage passes. Mounted in each collar 18 are a pair of slidable pins 37 and 38 which are adapted to project periodically a short distance from the faces of the collars, said pins being normally held retracted into the collars by spring means.

Referring to Figs. 10 to 17, and Fig. 8, the tying operation is shown. In the first step in the operation of tying a link, is the passage of a cord over a saddle 39 which when in the lowered position enables the free passage of the cord through a spring operated catch 40, normally tending to hold the cord tight. When the saddle is lowered, the catch engages a projection 41 (see Fig. 8) which raises the catch from the saddle to allow movement of the cord. The cord is passed over the collar 18 and engages the two pins 37 and 38. Initially the cord is passed over the collar 18 by hand, but after the machine has been placed in operation the cord is automatically moved to the desired positions over collar 18 as hereinafter described. As the collar 18 rotates, the saddle 39 is moved upward by rod 102 which is fixed to one end of a forked member 103 carrying a roller 104 which engages a cam 47, the forked member 103 riding upon the shaft 12, the saddle 39 being pivoted at 105, and slidable on the rod 102. The structure of each collar is the same and both collars are simultaneously engaged in the tying operation. That is, one collar 18 ties one end of the link of sausage and the other collar at the same time ties the other link.

As the collar 18 rotates, pin 43 movable therein engages a wedge-shaped cam 44 which causes the pin to move outwardly and engage the cord to provide a predetermined amount of slack therein (see Fig. 12). Further rotation of the collar causes the pin to engage a second wedge-shaped cam 45 to retract the pin 43. In the meantime, the saddle 39 has begun to move upwardly, and in so doing it engages one end of the wedge-shaped cam 44 which is pivoted at 46' and holds the wedge-shaped cam 44 in an out-of-the-way position so that it will not engage the pin 43 during the further rotation of the collar 18. When the saddle is raised, the catch 40 clamps down upon the cord and holds it in a taut position so that continued elevation of the saddle and rotation of the collar will cause the cord to be tightly wound about the sausage and squeeze the meat out of the junction between the links, (see Figs. 14 to 17).

A further revolution of the collar 18 provides another tying of the cord about the junction and since the cord is held tight by the catch at 40 and by the pins 37 and 38, the saddle is momentarily lowered to provide the necessary amount of cord for making a second turn about the junction between the links. The pins 37 and 38 are operated by means of a wedge 46 pivoted at 106 (see Figs. 8 and 9) and having one end thereof pivotally and slidably supported on a rod 107, carried by one end of a forked member 108 having a roller 109 engaging a cam 42 mounted on shaft 12, the forked portion of the roller riding on the shaft 12.

The machine is designed to make four turns of the cord during the linking operation. At the end of the four turns the knife 48 described above and operated by an arm 49 fixed to shaft 50 moves quickly to sever the cord. In the meantime, before cutting of the cord, the saddle 39 has been allowed to return to its lower position and the catch 40 is released to permit another length of cord to be drawn onto the collar 18.

The shaft 50 has fixed thereto an arm 51 provided at the free end thereof with a roller 52 engaging a cam 53 mounted on shaft 12. The action of the cam 53 causes the knife to move back and forth at the proper time.

It has been found that dry cord tends to tear the casings; and accordingly, the cords are moistened by passing them through troughs 135 containing water shown in Fig. 1.

In order to prevent the cord falling to one side during the tying operation, a stationary collar 136 is provided adjacent the collar 18, so that the cord lies at all times in the small space between the collars.

The foregoing disclosure is to be regarded as descriptive and illustrative of the invention, and not as restrictive or limitative of the invention, of which, obviously, embodiments may be constructed, including many modifications, without departing from the spirit and scope of the invention herein set forth and denoted in the appended claims.

Having thus described our invention, what we claim as new and desire to secure by Letters Patent, is:

1. In a sausage linking machine, a tube, means for feeding predetermined lengths of sausage periodically through said tube, a collar surrounding the tube, means to rotate the collar, a pin slidably mounted in the collar, means to normally hold the pin retracted in the collar, cam means movable to force the pin momentarily out of the collar at predetermined times, the exposed end of said pin being adapted to engage a cord for tying the sausage into links, a saddle over which the cord passes, a catch on said saddle to hold the cord tight when the saddle is raised, cam means to raise the saddle, and means carried by the collar to engage the cord to provide a predetermined length of cord.

2. In a sausage linking machine, a tube, means for feeding predetermined lengths of sausages through said tube, a collar surrounding the tube, means to rotate the collar, means carried by the collar for holding a cord, a saddle over which the cord passes, a catch on said saddle to tightly hold the cord when the saddle is raised, and means carried by the collar to engage the cord to provide a predetermined length of cord.

3. In a sausage linking machine, a tube, means for feeding sausage through said tube, a collar surrounding the tube, means to rotate said collar, means carried by said collar to releasably hold a cord, means carried by the collar to engage the cord to provide a slackness in the cord, means to hold the cord tightly at predetermined times to cause the meat in the sausage to be squeezed from the junction point between links, and a knife positioned near the collar to sever the cord after the sausage has been tied.

4. In a sausage linking machine, means for feeding predetermined lengths of sausage through said machine, a collar through which the sausage passes, a pair of spring controlled pins slidably mounted in the collar, means to rotate the collar, cam means to periodically move said pins to engage a cord, means carried by the collar for engaging the cord to provide a predetermined length of cord for the tying operation, a saddle over which the cord passes, means on said saddle to hold the cord taut when the saddle is raised, means to raise the saddle, and means to sever the cord after the tying operation.

5. In a sausage linking machine, a rack, a pinion engaging said rack, a stub shaft, one-way clutching means connecting said stub shaft and pinion, means carried by the stub shaft for feeding sausages through the machine, a lever connected to said rack, a plurality of links associated with said lever, and means to adjust the point of connection of said links to said lever to vary the throw of said lever to enable different lengths of sausage to be fed through said machine.

6. In a sausage linking machine, a tube, means for passing predetermined lengths of sausage through said tube, a collar surrounding said tube, means to rotate the collar, a pair of spaced pins adapted to project from one face of the collar to engage a cord, means carried by the collar to engage the cord to provide a predetermined length of cord, a saddle over which the cord passes, a catch carried by the saddle for gripping the cord, a boss engaging said catch to release the catch when the saddle is in a lowered position, and means to raise the saddle to cause the catch to tightly grip and hold the cord taut and pull on the cord so that, as the collar rotates, the pins and saddle will pull on the cord to squeeze meat from the sausage at the point where it is being tied.

7. In a sausage linking machine, a tube, means for feeding sausages through said tube, a collar surrounding the tube, means for rotating the collar, a pair of spaced pins slidably mounted in the collar, cam means to periodically move said pins to engage a cord, means carried by the collar to engage the cord to provide a predetermined length of cord, and means to hold the cord taut to cause the meat in the sausage to be squeezed from the junction point during the tying operation.

8. In a sausage linking machine, a tube, means for passing sausage through said tube, a collar surrounding the tube, means for rotating said collar, a pin slidably mounted in said collar, cam means adapted to move said pin to a position to engage a cord, means carried by the collar to engage the cord to provide a predetermined length of cord, a saddle over which the cord passes, a catch pivotally mounted on the saddle and adapted to tightly hold the cord when the saddle is raised, means to raise the saddle, a knife positioned adjacent the collar, and means to periodically move the knife to sever the cord.

9. In a sausage linking machine, a frame, a pair of base plates slidably mounted on said frame, means to slide said plates along the frame, tubes carried by the base plates, means for feeding sausage through said tubes, a rack, a pinion engaging said rack, said pinion operating said feeding means, a rocking arm connected to said rack, cam means to oscillate said rocking arm to and fro, and means to adjust the effective length of said arm to regulate the throw of said rack to control the length of sausage fed through the machine at each feeding operation.

10. In a sausage linking machine, a tube, means for feeding predetermined lengths of sausage periodically through said tube, a collar surrounding the tube, means to rotate the collar, a pin slidably mounted in the collar, means to normally hold the pin retracted in the collar, cam means movable to force the pin momentarily out of the collar at predetermined times, the exposed end of said pin being adapted to engage a cord for tying the sausage into links, a saddle over which the cord passes, a catch on said saddle to hold the cord tight when the saddle is raised, cam means to raise the saddle, and means carried by the collar to engage the cord to provide a predetermined length of cord, said means being arranged to wind loosely around the sausage casing and to draw the cord tight to eject the meat from a portion of the casing and to wind the cord a plurality of times around the casing from which the meat has been ejected.

11. In a sausage linking machine, a collar, means to rotate the collar, means for feeding the sausage through said collar, a clamp on said collar for gripping the end of a string, means carried by said collar for causing a slackness in the string to produce a loop of definite size around the sausage, a second gripping means cooperating with the first gripping means to pull tightly on the string, to eject meat from the sausage at the point where it is being tied, means to wind the cord a plurality of times around the portion of the casing from which the meat has been ejected, means to release the cord from the first gripping means, and means to sever the cord after the sausage has been tied.

12. In a sausage linking machine, means for feeding predetermined lengths of sausage through said machine, a collar through which the sausage is passed, means to rotate the collar, a pin slidably mounted in the collar and adapted to grip the end of a cord, means carried by the collar to engage the cord to provide a slackness therein to produce a loop of definite size about the sausage, a gripping device for the cord, means to move said gripping device at predetermined times to cooperate with said pin to pull the cord tightly about the sausage to squeeze the meat from a portion thereof, means adjacent said collar to maintain the cord in a definite vertical plane during the tying operation, and means to sever the cord after the sausage has been tied.

13. In a sausage linking machine, a collar, means for feeding predetermined lengths of sausages through said collar, means to rotate the collar, a pin slidably mounted in the collar, spring means tending normally to hold the pin retracted in the collar, cam means movable to force the pin momentarily out of the collar at predetermined times, the exposed end of said pin being adapted to engage a cord for tying sausage into links, a gripping device adapted to grip the cord, means carried by the collar to engage the cord to provide a slackness in the cord, and means to move the gripping device to cause it to cooperate with the pin to draw the cord tight to squeeze meat from the sausage casing at the point of junction between links.

14. In a sausage linking machine, a collar, feed rolls engageable with a sausage, a stub shaft connected to one of said feed rolls, a pinion fixed to said stub shaft, a rack engaging the pinion, means connected with the rack to move the rack a predetermined distance in one direction periodically to cause a predetermined length of sausage to be fed through the collar, means to rotate the collar, a pin slidably mounted in the collar, spring means tending normally to hold the pin retracted in the collar, cam means movable to force the pin momentarily out of the collar at predetermined times, the exposed end of said pin being adapted to engage a cord for tying sausage into links, a gripping device adapted to grip the cord, means carried by the collar to engage the cord to provide a slackness in the cord, and means to move the gripping device to cause it to cooperate with the pin to draw the cord tight to squeeze meat from the sausage casing at the point of junction between links.

15. In a sausage linking machine, a collar, means for feeding predetermined lengths of sausages through said collar, means to rotate the collar, a pin slidably mounted in the collar, spring means tending normally to hold the pin retracted in the collar, cam means movable to force the pin momentarily out of the collar at predetermined times, the exposed end of said pin being adapted to engage a cord for tying sausage into links, a gripping device adapted to grip the cord, means carried by the collar to engage the cord to provide a slackness in the cord, means to move the gripping device to cause it to cooperate with the pin to draw the cord tight to squeeze meat from the sausage casing at the point of junction between links, a knife, and cam means to move the knife periodically to sever the cord.

16. In a sausage linking machine, a collar, feed rolls engageable with a sausage, a stub shaft connected to one of said feed rolls, a pinion fixed to said stub shaft, a rack engaging the pinion, means connected with the rack to move the rack a predetermined distance in one direction periodically to cause a predetermined length of sausage to be fed through the collar, means to rotate the collar, a pin slidably mounted in the collar, spring means tending normally to hold the pin retracted in the collar, cam means movable to force the pin momentarily out of the collar at predetermined times, the exposed end of said pin being adapted to engage a cord for tying sausage into links, a gripping device adapted to grip the cord, means carried by the collar to engage the cord to provide a slackness in the cord, means to move the gripping device to cause it to cooperate with the pin to draw the cord tight to squeeze meat from the sausage casing at the point of junction between links, a knife, and cam means to move the knife periodically to sever the cord.

17. In a sausage linking machine, a frame, a platform slidably mounted on said frame, means for clamping the platform in adjusted positions on the frame, a bracket supported by the platform, a collar carried by the bracket, a shaft rotatably mounted on the frame, means to rotate the shaft, gear means associated with the collar to rotate therewith, a gear splined to said shaft and engaging said gear means associated with the collar, means to cause said gear to move with the bracket when the platform is moved, a second shaft, means to periodically rock said second shaft, a bushing splined to said second shaft and having an arm connected therewith, a knife carried by the free end of said arm, and means to cause said bushing and arm to move with the bracket when the platform is moved.

18. In a sausage linking machine, a frame, a platform slidably mounted on the frame, a collar rotatably mounted on the platform, means to hold the platform in adjusted positions on the frame, means to rotate the collar, means for feeding sausage through said collar, means carried by the collar for gripping the end of a cord, means carried by the collar for causing a slackness in the cord to produce a loop of definite size around the sausage, a gripping device for gripping the cord, said gripping device being adapted to cooperate with the clamp to pull tightly on the cord to eject meat from the sausage at the point where it is being tied, means to release the cord from the clamp at a predetermined time, and means to sever the cord after the sausage has been tied.

19. In a sausage linking machine, a collar, feed rolls engageable with the sausage, to feed it through the collar, a stub shaft fixed to one of said feed rolls, a pinion fixed to said stub shaft, a rack engaging the pinion, means to move the rack periodically in one direction to rotate the stub shaft in one direction to cause a predetermined length of sausage to be fed through the collar, a gear fixed to the collar, a second gear engaging a first gear, means to rotate the second gear to periodically rotate the collar, a clamp carried by the collar, means to periodically move the clamp to engage the cord, a gripping device adapted to grip the cord, means carried by the collar to produce a slackness of predetermined length in the cord, means to move said gripping device to cause it to cooperate with the clamp to draw the cord tight to squeeze meat from the sausage at the point of tying, means to wind a plurality of loops about the sausage at the point of tying, and means to sever the cord after the sausage has been tied.

20. In a sausage linking machine, a pair of collars, means for feeding predetermined lengths of sausage through said collars, means to rotate said collars, each collar having a clamp adapted to grip a cord, gripping devices positioned adjacent said collar for gripping the cord, means carried by each collar to produce a slackness of definite length in said cord, means to move said gripping devices to cause them to cooperate with said clamps to pull said cords tight to squeeze the meat from the sausage at each end of a link simultaneously at the point of tying, and means to sever the cord at each end of the link after said ends have been tied.

D. DOUGLAS DEMAREST.
CARL BERENDT.
WILLIAM KARIUS.